Patented July 5, 1927.

1,634,424

UNITED STATES PATENT OFFICE.

WILLIAM K. HUNTER, OF KNOXVILLE, TENNESSEE, ASSIGNOR OF ONE-HALF TO MARION F. NICHOLS, OF KNOXVILLE, TENNESSEE.

METHOD OF PRODUCING IMPROVED LIME HYDRATE.

No Drawing. Application filed July 22, 1925. Serial No. 45,428.

My invention relates to a method of producing an improved lime hydrate.

I have discovered that if lime (CaO), at a high temperature, such as is present when the calcium bearing rock is roasted or burned, for producing lime oxide, is introduced at kiln temperature into water which is preferably present in excess to that required to produce complete hydration, that the hydrated lime produced will possess superior qualities. It will be found to have a higher degree of plasticity or working qualities, and the particles of the hydrated lime are of a uniform smaller size. The hydrated lime produced is found to be more colloidal than the ordinary hydrated lime, and when wet with water, has the properties of coagulating the colloids into flocks, which hold the water, thus producing a greater plasticity or working quality in the hydrated lime, which is desirable when applying the same to a wall.

In accordance with the preferred embodiment of my method, the crushed lime producing rock, such as limestone or dolomite, is heated or roasted in any suitable kiln or appliance for burning lime, preferably the usual rotary kiln, as is customary in producing lime oxide. When being roasted for driving off the carbon dioxide gas, the rock is usually subjected to a temperature of from 1000° C. to 1200° C., but this temperature may vary, depending upon the character of the lime producing rock treated. The rock thus burned is converted into the lime or calcium oxide, and this lime discharges from the kiln at substantially the burning temperature, which in many instances, would be from 1000° C. to 1200° C. In accordance with my method this lime, while at the high or burning temperature, is preferably directly discharged into water, which may be cold or heated at or near the boiling point. The lime is thus brought into contact with the water while it is maintained at a high or burning temperature, that is a temperature from between 1000° C. to 1200° C., more or less. The water is present in excess with respect to that required for the complete hydration of the lime, whereby there is free water present in the resultant hydrated lime. No attempt is made to hydrate the lime oxide by steam, for producing a dry hydrated lime, by supplying to the lime, just the precise amount of water necessary to hydrate the same, but on the contrary, the water is present in an excess, so that free water is present in the resultant hydrated lime. I prefer to employ anywhere from 1 part by weight to 2 parts by weight of water to 1 part by weight of the lime producing rock, which is fed into the rotary kiln or burner. As is well known, 100 parts by weight of lime producing rock will ordinarily produce 56 parts by weight of lime. It is thus seen that the proportions stated, provide for an excess of water, after complete hydration. The hydrated lime produced may then be partly or wholly dried by any suitable means so that it is reduced to the desired content of water.

I have discovered that when the heated lime is thus discharged into the water, which may or may not be heated, that violent agitation occurs, due to the formation of steam, which is allowed to freely escape, with the result that the hydrated lime produced is found to be present in uniform finer particles, than the particles of ordinary hydrated limes. As a result of this, the water absorbing properties, plasticity, and workability of the hydrated lime, are increased to a marked extent.

After the heated or burned lime is thus discharged into the water, the hydration takes place in the presence of the high heat and violent agitation, as stated, and this heat and agitation is far in excess of those present when the lime at atmospheric temperature is introduced into water, in the ordinary method of hydrating lime, and in which the heat is produced entirely by the chemical reaction. After hydration, the hydrated lime may be partly or wholly dried by any suitable means, to obtain a hydrated lime of the desired content of water. After drying to the desired content of water, the hydrated lime may be passed into a beater mill, and then subjected to the action of air separation, in order to produce a fine dry powder, for shipping in bags.

It is preferred that the lime be discharged directly from the kiln into the water for hydration, but experiments which I have conducted show that satisfactory results are obtainable by discharging the lime from the kiln and allowing the same to cool, and then reheating to about substantially the roasting temperature, namely from between 1000° C. to 1200° C., more or less, and then introducing the lime, at this heated or roasting temperature, into water, which may be heated, the water being present in excess to complete hydration of the lime, for hydrating the same. It is essential that the lime when introduced into the water be heated at a sufficiently high temperature so that violent agitation will occur, with the free escape of the steam, while hydration is in progress, so that the material will be broken up into the finer or minute particles.

I have found that a temperature of from 1000° C. to 1200° C. will produce satisfactory results in treating lime from ordinary lime producing rock, but of course the temperature may be varied, it being sufficient that a temperature sufficiently high is employed, which will cause the hydrated lime to be produced in the finer or minute particles when brought into contact with water.

In the case of some lime stone, dolomite or other lime producing rock it is not necessary to heat the material to 1000° C., in order to reduce the calcium carbonate to calcium oxide, a temperature substantially below 1000° C. being sufficient, while in the case of some other lime producing rock it is necessary to heat the material materially above 1200° C. In the preferred practice of my process in which the lime is discharged directly from the kiln into the water at the completion of the lime burning operation, the lime is discharged into the water at the temperature at which the lime is produced and satisfactory results are obtained whether such temperature is below 1000° C., between 1000° C. and 1200° C., or about 1200° C.

In the embodiment of my process in which the lime is first produced, allowed to cool and reheated before discharging it into the water, I have found that satisfactory results may be attained by reheating the lime only to a temperature at which upon being discharged into the water, it produces violent ebullition of the water in contact therewith during the slaking operation. A considerable measure of success may be obtained by discharging the lime at a temperature of about 800° C. into the water but I have obtained the best results by heating the lime to a temperature of at least about 1000° C. In my process a temperature of from about 800° C. to about 1200° C. is regarded as a high heat or temperature and these terms are so employed in certain of the claims.

It is to be understood that the form of my invention herewith shown and described is to be taken as a preferred example of the same, and that various changes may be resorted to in the order of the steps of the method, and the temperatures varied, without departing from the spirit of my invention or the scope of the subjoined claims.

Having thus described my invention, I claim:

1. The method of producing a hydrated lime having a high plasticity, comprising subjecting a lime bearing rock to the action of a roasting temperature for producing lime, and directly discharging the lime from the heat treatment and at a roasting temperature into cold water which is present in excess to the amount required for complete hydration of the lime, while allowing the free escape of steam and gases from the water whereby a violent ebullition of water in contact with the lime occurs during the slacking operation, and allowing the slacking operation to be wholly completed in the presence of excess water.

2. The method of producing a hydrated lime having a high plasticity, comprising subjecting a lime bearing rock to the action of a roasting temperature for producing lime, and immediately discharging the lime from the heat treatment and at the roasting temperature into water which is present in excess to the amount required for complete hydration of the lime, while allowing the free escape of steam and gases from the water whereby a violent ebullition of the water in contact with the lime occurs during the slacking operation, and allowing the slacking operation to be wholly completed in the presence of the excess water.

3. The method of producing a hydrated lime having a high plasticity, comprising subjecting a crushed lime bearing rock to the action of a roasting temperature in a rotary kiln for producing lime and immediately and directly discharging the lime from the kiln and at the roasting temperature into water which is present in excess to the amount required for complete hydration of the lime while allowing the free escape of steam and gases from the water whereby a violent ebullition of water in contact with the lime occurs during the slacking operation, allowing the slacking operation to be wholly completed in the presence of the excess water and drying the resultant hydrated lime so that it is ready for shipment.

4. The method of producing hydrated lime having a high degree of plasticity, comprising introducing uncooled quicklime at a roasting temperature into water which is present in excess to the amount required for complete hydration of the lime while allowing of the free escape of steam and gases from the water whereby a violent ebullition of the water in contact with the lime occurs during the slacking operation and the lime is broken up into minute particles so that the slacking is complete, and allowing the slacking operation to be wholly completed in the presence of the excess water.

In testimony whereof I affix my signature.

WILLIAM K. HUNTER.